United States Patent [19]
Ha et al.

[11] Patent Number: 5,258,122
[45] Date of Patent: Nov. 2, 1993

[54] CROSS-FLOW FILTER DEVICE WITH PRESSURE-BALANCING FEATURE

[75] Inventors: Young S. Ha, Billerica; Eileen D. Surette, Revere; Martin J. Weinstein, Salisbury, all of Mass.

[73] Assignee: Amicon, Inc., Beverly, Mass.

[21] Appl. No.: 869,997

[22] Filed: Apr. 16, 1992

[51] Int. Cl.⁵ .............................................. B01D 61/18
[52] U.S. Cl. ................... 210/637; 210/655; 210/137; 210/321.65; 210/500.29
[58] Field of Search ........ 210/137, 637, 634, 644–647, 210/649–655, 97, 321.65, 348, 418, 405, 500.29–500.32

[56] References Cited

U.S. PATENT DOCUMENTS

| | | | |
|---|---|---|---|
| Re. 26,097 | 10/1966 | Michaels | 210/321 |
| 3,556,302 | 1/1971 | Agranat | 210/321 |
| 3,560,377 | 2/1971 | Loeffler | 210/23 |
| 4,031,008 | 6/1977 | Anno | 210/137 |
| 4,146,485 | 3/1979 | Broad | 210/416 R |
| 4,601,824 | 7/1986 | Dreyer | 210/232 |
| 4,695,380 | 9/1987 | Hilgendorff et al. | 210/347 |
| 4,789,480 | 12/1988 | Bruschke | 210/640 |
| 4,869,821 | 9/1989 | Korin | 210/321.64 |
| 4,880,537 | 11/1989 | Drori | 210/323.1 |
| 4,897,190 | 1/1990 | Klinkau et al. | 210/228 |

FOREIGN PATENT DOCUMENTS

| | | |
|---|---|---|
| 55-51606 | 12/1980 | Japan |
| 60-51506 | 3/1985 | Japan |
| 0295421 | 4/1990 | Japan |
| 7713116 | 5/1979 | Netherlands |

OTHER PUBLICATIONS

Filtron, "A Self-Contained Tangential Filtration Device for Laboratory/Pilot Scale Applications"; 1989; Filtron Technology Corporation. (4 pages).

Primary Examiner—Frank Sever
Attorney, Agent, or Firm—Nicholas P. Triano, III; William L. Baker

[57] ABSTRACT

This invention relates to cross-flow filtration and more particularly towards disposable, compact cross-flow filters and filtration methods incorporating a novel pressure-balancing arrangement comprising a flexible wall which expands and contracts in response to fluid pulsations. The invention further relates to methods of fluid concentration employing such a device to a fluid concentration system, and to methods of making such a filtration device.

20 Claims, 4 Drawing Sheets

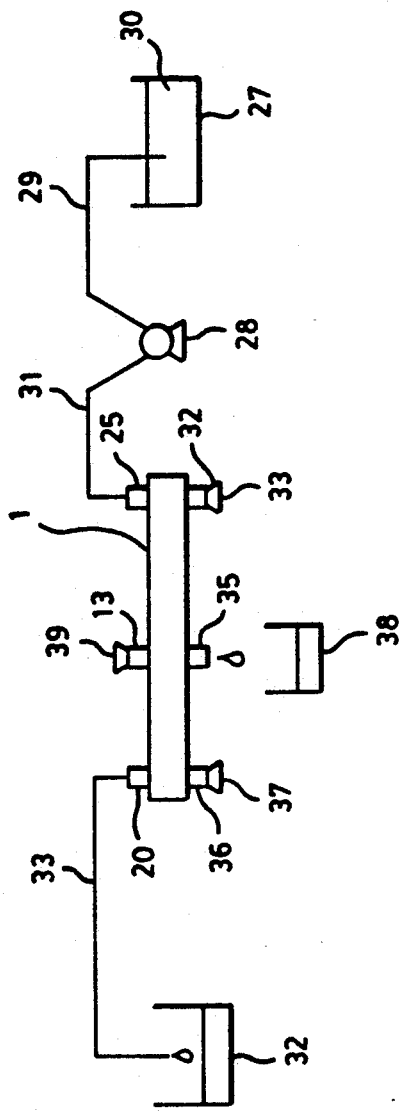
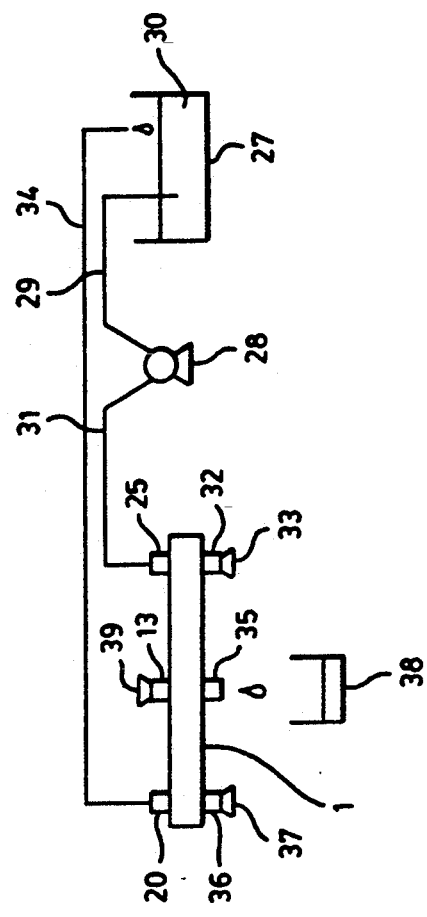
FIG. 4
FIG. 5

5,258,122

CROSS-FLOW FILTER DEVICE WITH PRESSURE-BALANCING FEATURE

FIELD OF THE INVENTION

The present invention relates to cross-flow filtration and more particularly towards disposable, compact cross-flow filters and filtration methods incorporating a novel pressure-balancing arrangement.

BACKGROUND OF THE INVENTION

It is often desirable to process fluids continuously through apparatus at elevated pressures. When such operations are carried out it is necessary to insure that the internal flow paths of the liquid being processed do not become short-circuited in such a way as to allow the feed stream to become mixed with the stream which has already been processed. Naturally, it is desirable to achieve these ends with the least cumbersome apparatus possible Generally, since the apparatus will be used in laboratory benchtop operations, it should be as compact and as light in weight as possible. In addition, it is desirable that the apparatus be easy to use, and disposable.

Ultrafiltration and microfiltration are chemical processing operations that are useful as practical operating methods for a large number of applications. The single most important step in achieving sustained practical filtration rates was the development of a family of anisotropic polymeric ultrafiltration and microfiltration membranes of various molecular weight cutoffs (MWCO) having effective pore sizes of from about 10Å to the micron range. These membranes exhibit very high flow rates at normal operating pressures, and good resistance to plugging. The latter phenomenon is believed to be largely assignable to a very thin barrier layer on the upstream side of the membrane which allows the membrane to perform as a surface-type rather than a depth-type filter. Such ultrafiltration and microfiltration membranes as described herein are commercially available under the trademark DIAFLO® from W. R. Grace & Co.-Conn.

In order to maintain a continuous flow of liquid at the desired high flow rates using these membranes, a widely accepted technique called "cross-flow" (or tangential-flow) filtration may be used in order to process a large volume of liquid in a short time. (Since cross-flow filtration is useful with microfiltration as well as ultrafiltration membranes, the word "filtration" will be used hereinafter to refer to both "microfiltration" and "ultrafiltration".) Rather than employing "well-stirred batch cells," i.e., cells wherein the solution in the cell to be filtered is constantly stirred by an agitating device riding just above the membrane surface at the bottom of the cell, in cross-flow filtration fluid flows across, or tangential to, the filtration membrane surface. High process flux is thus achieved because only the thin membrane surface acts as the sieving barrier, as opposed to depth filtration, where the whole thickness of the membrane is used. Cross-flow filtration also avoids the well-known problem of "concentration polarization," wherein solute rejected by the filtration membrane accumulates on the membrane surface to form a gel-like film which prevents further filtration.

A typical apparatus for carrying out cross-flow filtration is described in U.S. Pat. No. 3,556,302, the disclosure of which is herein incorporated by reference. Such a device comprises two deflection resistant plates and a flow-distributing means between said plates which flow-distributing means is maintained in intimate contact with the face of a filter by a hydraulic pressure difference maintained across the distributor plate. Such pressures are usually on the order of from about 30 psi. The hydraulic pressure difference ensures that the fluid flow channel formed by contact of the flow-distributing means and the membrane surface is not short-circuited. This results in a higher quality of filtration, but such units are very bulky and made of interlocking parts (often machined out of 316 stainless steel) which must be assembled and disassembled each time a new membrane is used; thus the unit is prone to leakage if not assembled properly. Integral filtration units reduce the leakage problem, but suffer the same problem of bulkiness.

Another problem associated with filtration units of this type is the physical deformation the membrane is subjected to from pulses from a fluid delivery device. A peristaltic pump is commonly used to deliver fluid to the unit; these pumps do not provide pulse-free fluid delivery. The fluid enters the device and the fluid pulses are absorbed by the deflection-resistant plates; however, this means that the more compliant distributor plate must "give", and it presses down on the compliant membrane with each pulsation of the fluid stream. This causes the membrane to physically "wear" faster than desired. Although some membrane materials may withstand this abuse, others cannot. The flow rate of the pump may be reduced to avoid the above problems, but at the expense of dimished throughput.

Thus, it is an object of this invention to provide a lightweight simple cross-flow filtration device which allows the highest permissible fluid flowrates, is advantageously disposable, leak-free, and which preserves the physical integrity of filter membranes by reducing fluid pulsation.

Further objects of the invention are to describe a method for concentrating fluid utilizing the device of the invention, and a fluid concentration system.

Other objects of the invention will be apparent to those skilled in the art upon reading this specification.

SUMMARY OF THE INVENTION

The present invention relates to a device for concentrating a fluid, comprising: 1) at least one drainage means for channeling away permeate, said drainage means being disposed on a surface of a planar object, and having superimposed over each said drainage means a concentrator unit comprising: a) filter means for separating a fluid into permeate and retentate components, said filter means superimposed over said drainage means; b) distribution plate means, superimposed over said filter means, for guiding said fluid tangentially over said filter means through a channel means defined by an elongated ridge formed of said distribution means and wherein said ridge is substantially in contact with the major surface of said filter means; and c) pressure-balancing chamber means superimposed over said distribution means and communicating with said channel means via a port formed in said distribution means wherein a pressure $P_o$ is created by introducing fluid into said pressure-balancing chamber means through a second port means communicating with said pressure-balancing chamber means, said chamber means further comprising a flexible wall means.

The invention further relates to methods of fluid concentration employing such a device to a fluid concentration system, and to methods of making such a filtration device.

DESCRIPTION OF THE DRAWINGS

FIG. 4 depicts a filter device of the invention, in simplified side view, in operation with a system of the invention.

FIG. 5 depicts a filter device of the invention, in simplified side view configured in "recycle" mode, in operation with a system of the invention.

DESCRIPTION OF THE INVENTION

The objects of the invention have been substantially accomplished by the construction and utilization of apparatus, which, briefly, in its most advantageous configuration comprises a plate comprising drainage means superimposed on each major surface thereof, and over each drainage means is superimposed a concentrator unit. Each such concentrator unit comprises a plurality of intercommunicating chambers to facilitate fluid filtration, and further comprises a filter membrane superimposed over a drainage means, a distribution means for guiding fluid over the filter membrane surface to effect filtration, and a pressure-balancing chamber means superimposed over the distribution means, comprising a flexible wall. Fluid entering the pressure-balancing chamber means creates a pressure which acts on the distribution means to ensure contact between the distribution means and the filter membrane surface. This ensures that the fluid paths created by contact of the distribution means with the filter membrane surface are not short-circuited, which can lead to inefficient filtration. Further, the flexible wall expands and contracts in response to fluid pulsations; thus, since the distribution means is now substantially relieved of having to repeatedly flex onto and off the filter membrane surface in response to fluid pulsations, the filter membrane in contact with the distribution plate is now subject to less physical stress.

As indicated above, an advantage to the invention is that a filter device made in accordance with it is light, easy to use, leak-free, and disposable. (However, it is contemplated that such filter devices may also be large and reusable, being constructed, e g. of materials such as 316 stainless steel, and might be used e.g. in process applications.) As such, a filter device of the invention may advantageously be made of interlocking parts made of polymeric material, which are integrally assembled to provide a unit which may be used, for example, for treating biohazardous liquids, then thrown away. This would afford the laboratory worker reduced exposure to biohazardous materials he or she would normally encounter disassembling and cleaning a conventional filter device of the current art. In addition an integral unit would eliminate having to be concerned with o-ring seals and other hardware required by filter devices of the current art requiring assembly, which could be assembled improperly by a tired lab worker and could thus leak, or not work at all.

The description above, and that which follows, is only meant to describe one particularly advantageous embodiment of the present invention and as such is only meant to illustrate, not limit it.

Figure 1:
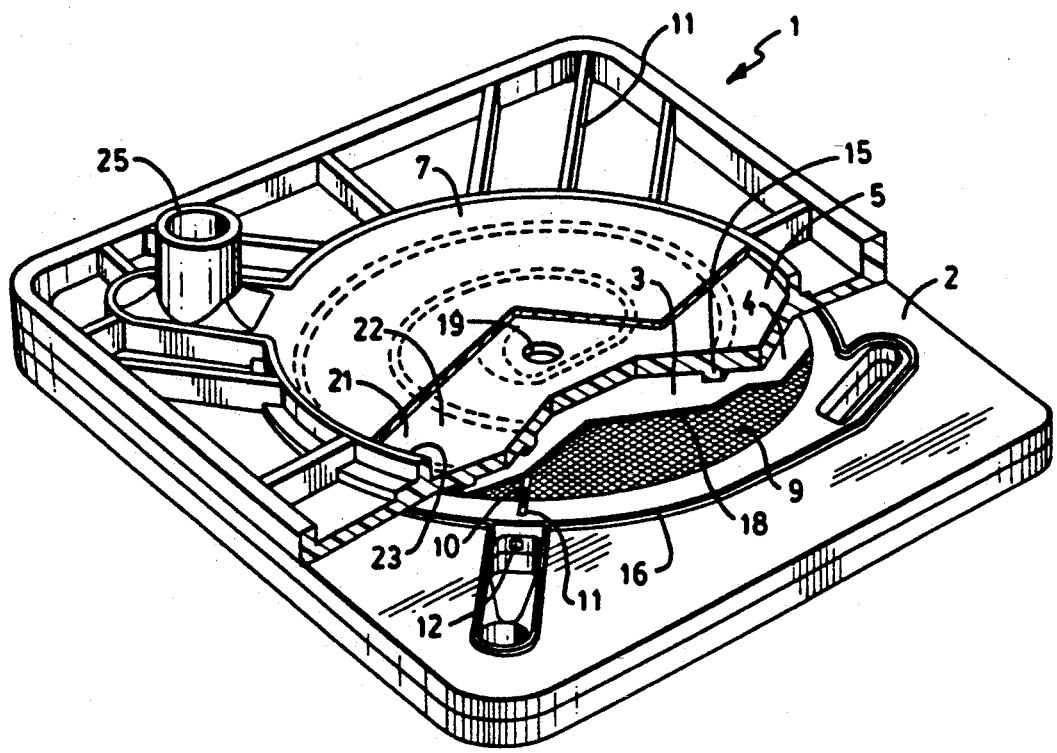
FIG. 1 depicts in perspective view a device constructed in accordance with the invention
Figure 3:
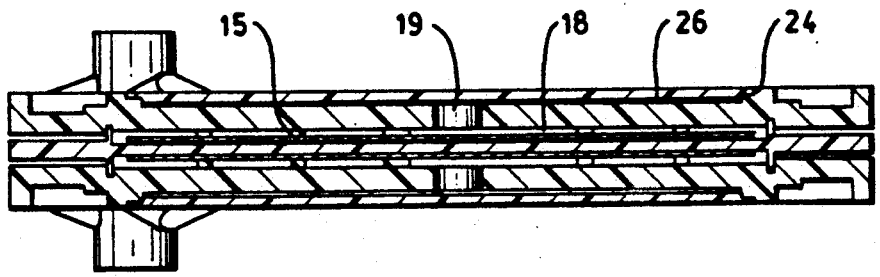
FIG. 3 depicts the assembled device of FIG. 2 in cross-sectional view.
Figure 2:
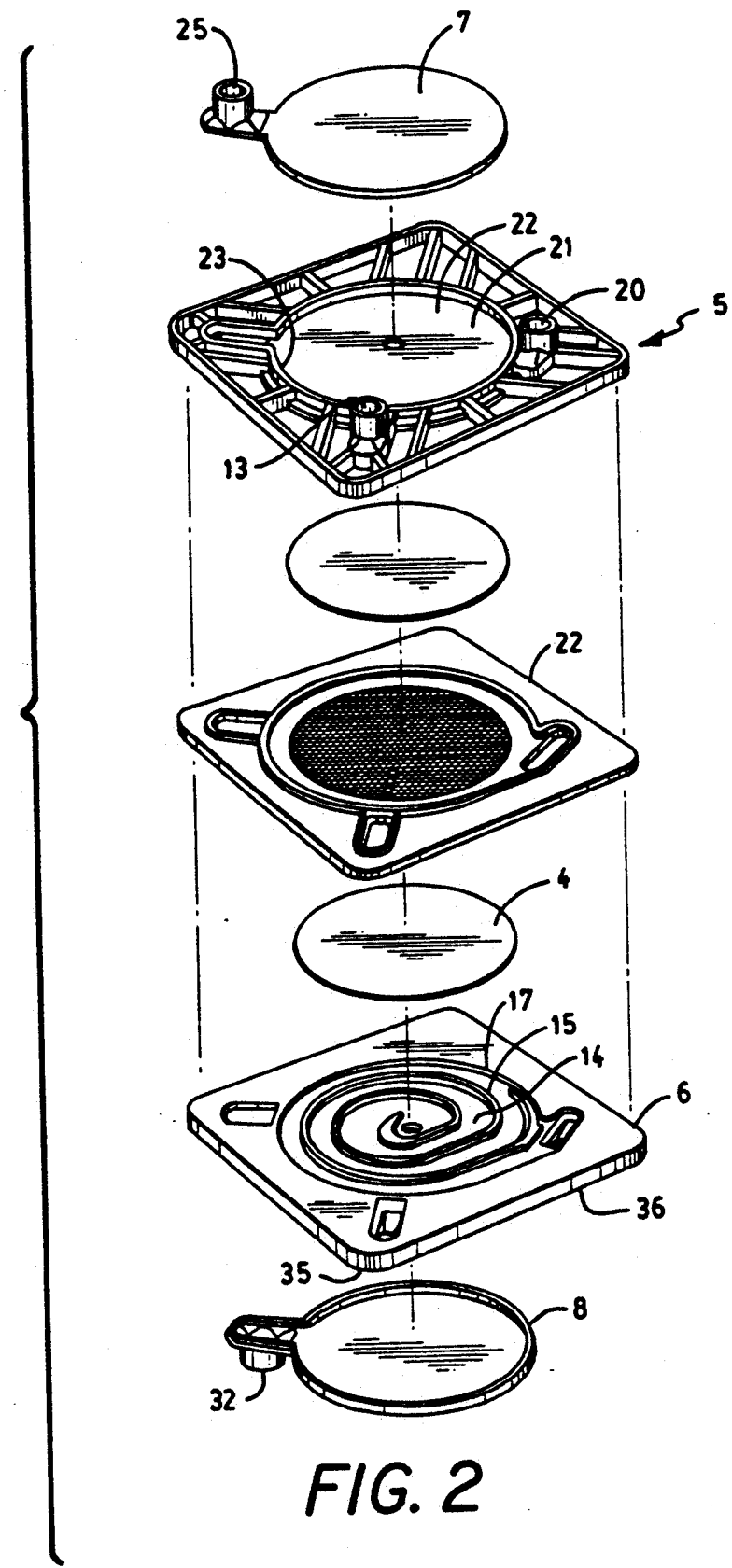
FIG. 2 depicts the same device, in exploded view, before assembly.

Referring now to the drawings, FIG. 1 depicts a particularly advantageous embodiment of the device of the invention, wherein a filter device 1 is formed of a plurality of interlocking parts; the interlocking relationship between the parts of such a device is most easily seen in FIG. 2. Preferably the filter device is, when assembled, about 15 to 20 cm long on each side and about 3 to 5 cm thick; these dimensions are in keeping with the desire to provide a compact, disposable unit for benchtop lab work. Referring now to FIGS. 1 and 2, it is seen that a filter device 1 which comprises two concentrator units is made of a drainage plate 2, filter membranes 3 and 4, distribution plates 5 and 6, and flexible wall plates 7 and 8.

Upon each major face of drainage plate 2 is superimposed a drainage grid 9, a drainage groove 10 communicating with a drainage channel 11 which communicates with an drainage opening 12, and a filtration chamber wall 16. The drainage grid 9 is designed to accept a filter membrane 3 which is attached at every point along its periphery to the edge of the drainage grid 9 in a way that liquid must pass through membrane 3 to reach the drainage grid 9. The membrane 3 may be preferably heat sealed in place, or glued or mechanically fastened by means of O-rings or gaskets. Suitable membranes which may be used, without limitation, in the invention are listed in Table 1, below, i.e., cellulosic, polysulfone, and DYNEL TM (trademark for a high-melting point synthetic fiber comprising a copolymer of vinyl chloride and acrylonitrile).

When the device is in operation permeate passes through the filter membrane 3 and onto the drainage grid 9, which is suitably a network of criss-crossing shallow grooves formed in said drainage plate 2 which can conduct permeate to a drainage groove 10 which carries the permeate to drainage channel 11 and a drainage opening 12 communicating with permeate port 13, from which the permeate exits the device. The surface of the drainage grid 9 comprising the network of criss-crossing shallow grooves should be designed in such a way as to be deep enough to conduct fluid, but also to provide a support surface for the filter membrane 3 so it does not collapse under pressure into the groove network. The drainage grid 9 may be easily designed by those of ordinary skill in the art, but a suitable surface pattern design which may be used is the MT-975 surface from Mold-Tech of Chicopee, Mass.

Superimposed on the filter membrane 3 and drainage grid 9 of drainage plate 2 is a distribution plate 5. On the side of the distribution plate 5 facing filter membrane 3 is a recessed support surface 14. Formed out of recessed support surface 14 is a ridge 15 which suitably begins a curvilinear path from its starting point near the center of recessed support surface 14 and proceeds outward. When the distribution plate 5 is assembled to the drainage plate 2 in such a manner as to interlock the filtration chamber wall 16 with a complementary channel 17, the ridge 15 contacts the filter membrane 3 to form a thin channel 18 through which fluid to be filtered may pass to effect cross-flow filtration by filter membrane 3. Liquid enters the thin channel 19 through port 19, passes through thin channel 18, and any retentate remaining at the end of thin channel 18 passes out retentate port 20.

On the other side of the distribution plate 5 is a recess 21 having a floor 22, a wall 23 having a shoulder 24, and an exit port 19 communicating with thin channel 18. A flexible wall plate 7 having a fluid port 25 interlocks with complementary shoulder 24 to form a pressure-balancing chamber 26. The modulus of the flexible wall is preferably less than that of the distribution plate 5, i.e., it is relatively more flexible to allow for expansion and contraction in response to fluid pressure pulsations. Fluid enters chamber 26 through fluid port 25. Exit port 19 acts as a restriction on fluid flow from chamber 26 into thin channel 18, so as the pressure-balancing chamber 26 fills with fluid, a fluid pressure $P_o$ is generated within pressure-balancing chamber 26, which acts on flexible wall plate 7 and floor 22, and in turn, on surface 14 to keep ridge 15 substantially in contact with the surface of membrane 3. The large volume of chamber 26 relative to that of thin channel 18, and the small size of port 19 insures that $P_o$ will always be greater than the average fluid pressure $P_1$ in the thin channel 18. As a rule of thumb $P_o$ will generally be in the range of from 2 to 30 psi and the flow rate tends to range from 50 to 1000 ml/min when the device is operated in its usual manner, i.e., when the device is configured in "recycle" mode, i.e., as in FIG. 5. When the device is configured in "single pass" mode, as depicted in FIG. 4., $P_o$ tends to range from 0 to 2 psi and the flow rate will generally be in the range of 0.5 to 20 ml/min.

An additional concentrator unit as described above is superimposed on the other side of drainage plate 2 to form a filter unit comprising two concentrator units, depicted in exploded view in FIG. 2, and as assembled in FIG. 1. With appropriate modification of the filter device described above, filtration may occur singly in either concentrator unit, or simultaneously in both concentrator units. The advantage in carrying out filtration in both concentrator units simultaneously is that any outward deflection of drainage plate 2 caused by the fluid pressures $P_o$ and $P_1$ generated in one concentrator unit will be offset by equivalent pressures from the concentrator unit superimposed over the other side of drainage plate 2. Thus the drainage plate does not have to be bulky or reinforced to withstand deflection, which reduces the mass of the device and its manufacturing cost.

A system for concentrating fluids employing the dual-concentrator unit described above is schematically illustrated, in simplified side view, in FIGS. 4 and 5. A fluid reservoir 27, supplying fluid 30 to be filtered, feeds a peristaltic pump 28 through a reservoir conduit 29. The pump delivers fluid 30 to a filter device 1, through a conduit 31 which attaches to an fluid port 25 of filter device 1. (Fluid port 32 is plugged with plug 33 because fluid port 32 communicates with fluid port 25 to allow interconnection of multiple filter devices 1 as described below.) The fluid entering fluid port 25 enters each concentrator unit and is processed as previously described. Retentate is either collected in retentate reservoir 32 from conduit 33 connected to retentate port 20, as shown in the single pass system of FIG. 4, or if the system is setup in recycle mode as in FIG. 5, returned to reservoir 27 via conduit 34 connected to retentate port 20 for reprocessing. Permeate is collected in reservoir 38 from permeate port 35. Permeate port 13, which communicates with permeate port 35, is plugged with plug 39, and retentate port 36, which communicates with retentate port 20, is plugged with plug 37.

In the system using the device of the invention in "recycle" mode as depicted in FIG. 5, the fluid 30 in the reservoir 27 is enriched in the solutes that do not pass through the membrane. This is an advantageous way to concentrate fluids for further processing.

Figure 6:
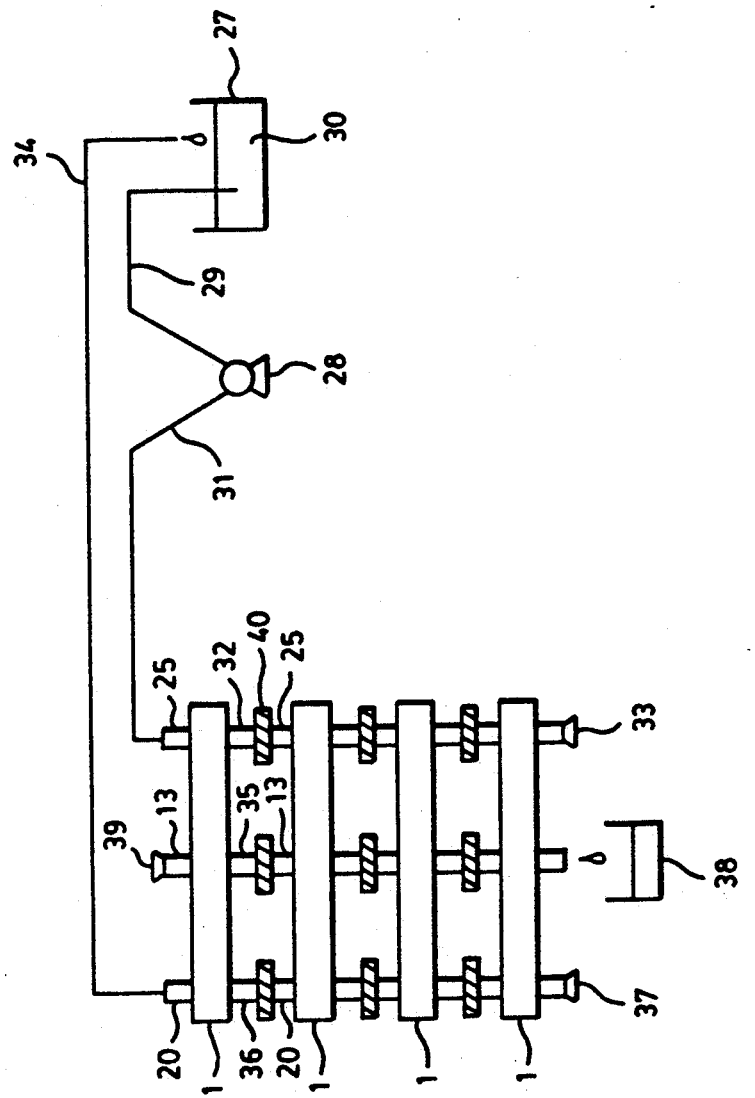
FIG. 6 depicts filter devices of the invention, in simplified side view advantageously joined in parallel and configured in "recycle" mode, in operation with a system of the invention.

A particular advantage to the filter device of the invention described above is that a number of the devices of FIG. 1 may be joined together in parallel in order to enhance the filtration process, as has been done in FIG. 6, shown as configured for the recycle mode. This configuration allows for more membrane surface to be utilized for filtration, and thus a larger feed volume of fluid may be processed by the system. This may easily be done by equipping the individual ports 20, 13, and 25 of each filter device 1 with connecting means 40 for interlocking said ports with complementary ports 36, 35, and 32 on adjoining filter devices 1, and fitting the units together.

The various parts of the filter device are advantageously designed to interlock with each other to simplify manufacture. In keeping with the desire for these filter devices to be disposable, the parts should be bonded to each other permanently, e.g. by gluing, mechanical attachments, i.e. screws or other fasteners, or by such techniques as ultrasonic welding. The latter technique would appear to be better suited to automated mass-production of the filter devices.

The parts of the filter device may be constructed of any material which is chemically non-reactive with the fluids to be processed, and which is appropriate to maintain the structural integrity of the assembled device. Plastic or polymeric materials are advantageous, because these are light in weight and inexpensive to fabricate parts from.

It should be noted that the above example and description of the preferred embodiments of the invention are intended to illustrate the invention and are not meant as a limitation on it. It is intended that modifications, variations and changes to the invention may be made within the scope of the appended claims without departing from the spirit and scope of the present invention.

TABLE 1

| Membrane Name | Membrane Type | MWCO | Classification |
|---|---|---|---|
| YCO5 | Cellulosic | 500 | Ultrafiltration |
| YM1 | " | 1000 | " |
| YM3 | " | 3000 | " |
| YM10 | " | 10000 | " |
| YM30 | " | 30000 | " |
| YM100 | " | 100000 | " |
| PM10 | Polysulfone | 10000 | " |
| PM30 | " | 30000 | " |
| XM50 | DYNEL TM | 50000 | " |
| XM300 | " | 300000 | " |
| GLS.2 | Polysulfone | 0.2 mµ | Microfiltration |
| GLS.45 | " | 0.45 mµ | " |

W.R. Grace & Co.-Conn.

What is claimed:

1. A device for concentrating a fluid, comprising:
1) at least one drainage means for channelling away permeate, said drainage means being disposed on a surface of a planar object, and having superimposed over each said drainage means a concentrator unit comprising:

a) filter means for cross-flow filtration of fluid into permeate and retentate components, said filter means superimposed over said drainage means;

b) distribution plate means, superimposed over said filter means, for guiding said fluid tangentially over said filter means through a channel means defined by an elongated ridge formed of said distribution means and wherein said ridge is substantially in contact with the major surface of said filter means; and c) pressure-balancing chamber means superimposed over said distribution means and communicating with said channel means via a port formed in said distribution means wherein a pressure $P_o$ is created by introducing fluid to be treated into said pressure-balancing chamber means through a second port means communicating with said pressure-balancing chamber means, said chamber means further comprising a flexible wall means.

2. The device of claim 1 comprising at least two said drainage means.

3. The device of claim 1 wherein said filter means is selected from the group consisting of cellulosic membrane materials, polysulfone membrane materials, and synthetic fiber membrane materials comprising a copolymer of vinyl chloride and acrylonitrile.

4. The device of claim 1 wherein said filter means is of circular or elliptical shape and said fluid is guided over said filter means by said distribution means through said channel means, said channel means arranged over said filter means in a curvilinear fashion.

5. The device of claim 1 wherein said drainage means and said concentrator unit, except for said filter means, are formed of a polymeric or plastic material.

6. A method of concentrating a fluid, comprising:
1) providing a device for concentrating a fluid comprising a plate, having superimposed over at least one major surface of said plate a concentrator unit;
2) introducing a fluid into said device;
3) introducing said fluid into at least one of said concentrator units, comprising the steps of:
a) introducing said fluid into a chamber, said fluid creating a pressure $P_o$ within said chamber which acts to force a distribution plate disposed beneath said chamber substantially in contact with a filter disposed directly beneath said plate to form an elongated channel formed over said filter, said channel having a starting point and a terminus;
b) introducing said fluid into said starting point of said channel formed by the surface of said filter and said plate;
c) guiding said fluid over said filter through said channel so as to promote separation by cross-flow filtration of said fluid into permeate and concentrate;
d) removing said permeate passing through said filter onto a drainage surface, from the device; and
e) removing said concentrate remaining at said terminus of said channel.

7. The method of claim 6 wherein said device comprises at least two concentrator units.

8. The method of claim 6 wherein said filter means is selected from the group consisting of cellulosic membrane materials, polysulfone membrane materials, and synthetic fiber membrane materials comprising a copolymer of vinyl chloride and acrylonitrile.

9. The method of claim 6 wherein said filter means is of circular or elliptical shape and said fluid is guided over said filter means by said distribution means through said channel means, said channel means arranged over said filter means in a curvilinear fashion.

10. The method of claim 6 wherein said drainage means and said concentrator unit, except for said filter means, are formed of a polymeric or plastic material.

11. A system for concentrating fluids, comprising:
1) a device for concentrating a fluid, comprising:
a) at least one drainage means for channeling away permeate, said drainage means being disposed on a surface of a planar object, and having superimposed over each said drainage means a concentrator unit comprising:
b) filter means for cross-flow filtration of a fluid into permeate and retentate components, said filter means superimposed over said drainage means;
c) distribution plate means, superimposed over said filter means, for guiding said fluid tangentially over said filter means through a channel means defined by an elongated ridge formed of said distribution means and wherein said ridge is substantially in contact with the major surface of said filter means; and
d) pressure-balancing chamber means superimposed over said distribution means and communicating with said channel means via a port formed in said distribution means wherein a pressure $P_o$ is created by introducing fluid to be treated into said pressure-balancing chamber means through a second port means communicating with said pressure-balancing chamber means, said chamber means further comprising a flexible wall means;
2) conduit means for supplying fluid to be treated, communicating with said device;
3) pump means for delivering fluid to said device, communicating with said conduit means; and
4) reservoir means, for supplying said fluid to said pump means, communicating with said pump means.

12. The system of claim 11 wherein said filter device comprises at least two said drainage means.

13. The system of claim 11 wherein said filter means is selected from the group consisting of cellulosic membrane materials, polysulfone membrane materials, and synthetic fiber membrane materials comprising a copolymer of vinyl chloride and acrylonitrile.

14. The system of claim 11 wherein said filter means is of circular or elliptical shape and said fluid is guided over said filter means by said distribution means through said channel means, said channel means arranged over said filter means in a curvilinear fashion.

15. The system of claim 11 wherein said drainage means and said concentrator unit, except for said filter means, are formed of a polymeric or plastic material.

16. A device for concentrating a fluid, comprising:
1) plate means for supporting at least one concentrator unit superimposed over a major surface of said plate means, said concentrator unit comprising:
2) drainage means for channeling away permeate passing through a filter, comprising a system of channels for conducting permeate towards a port means for removing permeate, said port means communicating with said drainage means;

3) filter membrane means for cross-flow filtration of fluid superimposed over said drainage means and attached at every point along the periphery of said membrane to said drainage means; and
4) distribution plate means superimposed over said filter means, comprising:
   a) relatively inflexible plate means comprising a fluid inlet means;
   b) fluid guide means comprising an elongated ridge substantially in contact with said filter means, beginning near said inlet means and proceeding in a curvilinear or linear fashion to a terminus so as to form a channel to conduct fluid over the surface of said filter;
   c) a port means for removing retentate, located at said terminus of said channel;
   d) pressure balancing chamber means superimposed over said distribution means comprising a flexible (relative to that of said distribution means) wall means; and
   e) an inlet port means for introducing fluid to be treated into said chamber.

17. The device of claim 16 wherein said filter membrane means is selected from the group consisting of cellulosic membrane materials, polysulfone membrane materials, and synthetic fiber membrane materials comprising a copolymer of vinyl chloride and acrylonitrile.

18. The device of claim 16 comprising at least two said drainage means.

19. The device of claim 16 wherein said filter means is of circular or elliptical shape and said fluid is guided over said filter means by said distribution means through said channel means, said channel means arranged over said filter means in a curvilinear fashion.

20. The device of claim 16 wherein said drainage means and said concentrator unit, except for said filter means, are formed of a polymeric or plastic material.

* * * * *